(12) United States Patent  (10) Patent No.: US 7,830,072 B2
Schmidt  (45) Date of Patent: Nov. 9, 2010

(54) ELECTROMECHANICAL ROTATION CONVERTER AND A METHOD FOR GENERATING ELECTRICAL ENERGY USING AN ELECTROMECHANICAL ROTATION CONVERTER

(75) Inventor: Frank Schmidt, Altkirchen (DE)

(73) Assignee: EnOcean GmbH, Oberhaching (DE)

( * ) Notice: Subject to any disclaimer, the term of this patent is extended or adjusted under 35 U.S.C. 154(b) by 0 days.

(21) Appl. No.: 12/391,837

(22) Filed: Feb. 24, 2009

(65) Prior Publication Data
US 2009/0218915 A1 Sep. 3, 2009

Related U.S. Application Data

(63) Continuation of application No. PCT/EP2007/058287, filed on Aug. 9, 2007.

(30) Foreign Application Priority Data

Aug. 25, 2006 (DE) ........................ 10 2006 039 936

(51) Int. Cl.
*H01L 41/113* (2006.01)
(52) U.S. Cl. ..................................... 310/339; 310/329
(58) Field of Classification Search ................ 310/329, 310/339, 367
See application file for complete search history.

(56) References Cited

U.S. PATENT DOCUMENTS 4,814,753 A * 3/1989 Coppola ..................... 340/689
6,134,964 A * 10/2000 Jaenker et al. ............ 73/514.21
6,237,403 B1 5/2001 Oldenettel et al.
7,345,372 B2 * 3/2008 Roberts et al. .............. 290/1 R
7,439,657 B2 * 10/2008 Clingman et al. ........... 310/339
7,504,764 B2 * 3/2009 Chang et al. ................. 310/339
7,511,404 B2 * 3/2009 Lee ............................. 310/339
7,649,276 B2 * 1/2010 Kornbluh et al. .............. 290/53
2003/0146676 A1* 8/2003 Mancosu et al. ............ 310/339

FOREIGN PATENT DOCUMENTS

| DE | 197 28 419 | 2/1999 |
|---|---|---|
| DE | 199 29 341 | 12/2000 |
| DE | 102 59 056 | 9/2004 |
| DE | 103 59 990 | 11/2006 |
| EP | 0 725 452 | 1/1996 |
| WO | WO 2004/054823 | 7/2004 |
| WO | WO 2005/062443 | 7/2005 |

* cited by examiner

*Primary Examiner*—Thomas M Dougherty
(74) *Attorney, Agent, or Firm*—Cohen Pontani Lieberman & Pavane LLP

(57) ABSTRACT

An electromechanical rotation converter having at least one fastening element, an oscillating element, a connecting element and an electromechanical conversion device. The fastening element is designed to fasten the rotation converter to a rotating body. The connecting element forms a movable connection between the fastening element and the oscillating element, and the movement of the oscillating element drives the electromechanical converter. The connection between the fastening element and the oscillating element is such that the center of mass of the oscillating element follows a curved path in such a way that the path describes the perimeter of a surface, the normal to the surface being at an angle to the axis of rotation that is less than 90 degrees and greater than 0 degrees.

15 Claims, 3 Drawing Sheets

ELECTROMECHANICAL ROTATION CONVERTER AND A METHOD FOR GENERATING ELECTRICAL ENERGY USING AN ELECTROMECHANICAL ROTATION CONVERTER

RELATED APPLICATIONS

This is a continuation of International Application No. PCT/EP2007/058287, filed on Aug. 9, 2007, which claims priority from German Patent Application No. 10 2006 039 936.6, filed on Aug. 25, 2006, the content of which is hereby incorporated by reference.

FIELD OF THE INVENTION

The present invention concerns an electromechanical rotation converter and a method for generating electrical energy using a rotation converter.

BACKGROUND OF THE INVENTION

Rotating parts such as wheel axles, shafts, vehicle wheels, machine tool parts and similar items are often monitored to determine particular parameters such as their temperature, internal pressure, portions, expansion, force and so on. Parameters of this sort can be measured by means of appropriate sensors. These applications meet difficulty when passing the values measured by sensors attached to rotating parts, such as those mentioned above, to the outside. Transmission along wires is not possible, particularly under circumstances where the parts do not move predictable, restricted distances in some direction. Certainly it is possible to exploit sliding contacts on parts that rotate slowly. Sliding contacts, however, have the disadvantage that they are subject to wear as a result of the constant friction, and that at high speeds of rotation the reduction in contact pressure leads to inadequate contact quality. Specially designed contacts can indeed provide secure contact pressure, but this brings high costs with it.

For this reason the method of transmitting signals from a measuring sensor on rotating parts by radio has been known for some years. Radio techniques, however, also require a power supply, and in the absence of contacts to transmit electronic signals, an independent power supply is necessary. Batteries, accumulators or similar devices represent obvious solutions.

Providing the energy by means of batteries, accumulators or similar devices is, for straightforward cases, an entirely practical solution. Batteries and accumulators are often unsuitable, however, if access to the sensor is difficult, or if the measured parameter has relevance to the safety of operation of the rotating part. The particular disadvantage is that, in the event of a sudden drop in the supply voltage, i.e. of the battery voltage, transmission from the measuring sensor can no longer be reliably assured, which may mean that safety-relevant information is no longer made available.

For this reason, the idea of providing an independent energy generator has already been considered. Generally speaking, solutions that exploit solar cells or other more or less usual generating methods are plausible. DE 102 59 056 A1 describes the structure of an electromechanical vibration converter, in which an oscillating weight is positioned on an oscillating arm that is located on a rotating element in such a way that the oscillating arm is aligned parallel to the axis of rotation. One side of the oscillating arm is fixed to the rotating part, and the oscillating mass is at the other end. The rotary movement causes the mass to oscillate whenever the axis of the rotation is not aligned with the direction of gravity. Because, as a result of the rotation, the oscillating mass is pulled in different directions at different times by gravity, oscillation develops. This is particularly encouraged if there is no opposing force. The oscillating mass now drives an electromechanical energy converter, generating an electrical oscillation from the mechanical oscillating movement. The disadvantage of this arrangement, however, is that as the speed of rotation increases, centrifugal force pulls the oscillating mass out of its path, preventing the oscillation.

SUMMARY OF THE INVENTION

One object of the present invention is to provide an arrangement in which an electromechanical energy converter can be used reliably and without great expense, even on rapidly rotating systems or on systems with a high rotary speed.

This and other objects are attained in accordance with one aspect of the present invention directed to an electromechanical rotation converter, with at least one fastening device, an oscillating element, a connecting element and an electromagnetic converter, where the fastening element is designed to attach the rotation converter to a rotating body. The connecting element constitutes a movable connection between the fastening element and the oscillating element, while the movement of the oscillating element drives the electromechanical converter. The connection between the fastening element and the oscillating element is here constructed in such a way that the center of mass of the oscillating element follows a curved path that describes the perimeter of a surface, the normal to that surface and the axis of rotation together enclosing an angle between them that is less than 90 degrees and greater than zero degrees. This means that the oscillating element between the fastening element and the oscillating element comprises an oscillating arm that is inclined with respect to the axis of rotation. The angled position is selected in such a way that the centrifugal force does not prevent the oscillation.

The electromechanical converter device is favourably implemented as a piezo-electric element. The piezo-electric element has an inherent elasticity, thus providing a returning force, as is necessary to generate an oscillation. Giving the electromechanical converter device the form of a flexural converter with a trapezoidal geometry yields the advantage that the force is evenly distributed across the entire flexural converter during its excursions along the bending path.

The use of an electromagnetic generator or of a magnetostrictive generator as the electromechanical converting device is highly economical.

If a spring is selected as the connecting element, the electromechanical converter does not require any inherent elasticity in order to provide the returning force. A leaf spring is a particularly suitable spring for this application. Alternatively the connecting element can take the form of a pivot bearing. It is then favourable for the fastening device to comprise part of a housing for the rotation converter. Here, when fastening to a wheel rim, such as the rim of a car wheel, the use of a tape or cable element is advantageous.

When applied to the tires of motor vehicles, it is favourable for the rotation converter to be attached to the valve fastener on the wheel rim. If in this case it has two contact points at some distance from the valve, the housing of the rotation converter can be aligned appropriately towards the center of rotation. This is particularly appropriate if the contact points are located at different distances from the valve or valve fastening.

A method is, moreover, disclosed for generating electrical energy by means of an electromechanical converter device in such a way that the converter device is driven by an oscillating element, the oscillating element oscillates about a rest position during rotary movement, thereby following a curved path. The curved path here describes the perimeter of a surface, the normal to the surface and the axis of rotation together enclosing an angle between them that is less than 90 degrees and greater than zero degrees.

BRIEF DESCRIPTION OF THE DRAWINGS

The invention is explained in detail below with the aid of examples of embodiments and with reference to the drawings.

DETAILED DESCRIPTION OF THE DRAWINGS

Figure 1:
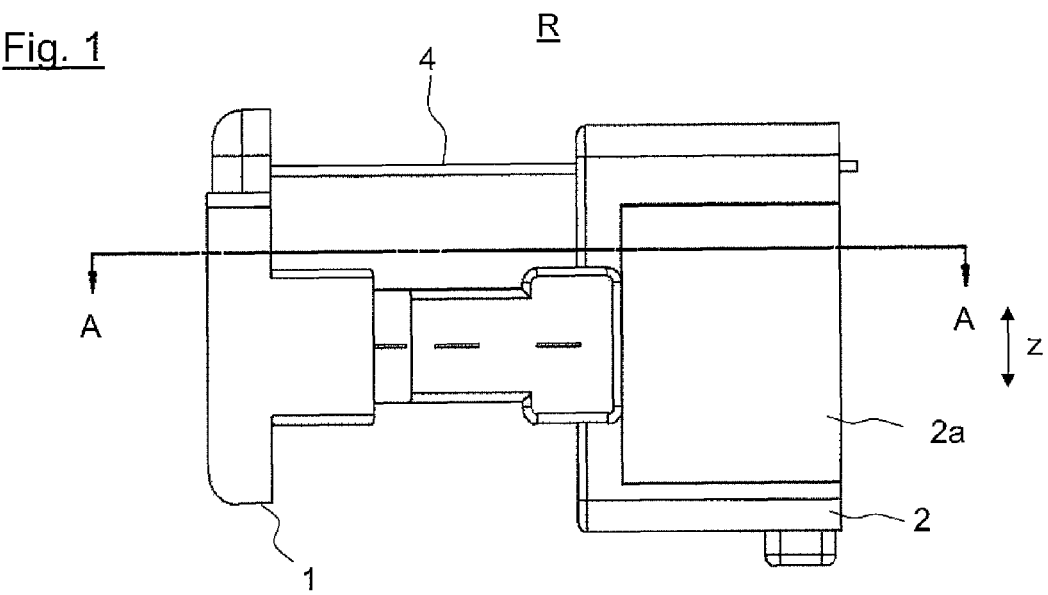
FIG. 1 is a side view of an electromechanical rotation converter.

Elements that are identical, or that have identical effects, are given the same reference codes in the drawings.

FIG. 1 shows a side view of an electromechanical rotation converter R. A fastening device 1 is provided, designed in such a way that it can be attached to a rotating body. An oscillating element 2 is included which, in the embodiment illustrated, features an oscillating mass 2a. Because this oscillating mass 2a is manufactured separately from the oscillating element, and can therefore be separated from it, an oscillating element of the same size can be fitted with different oscillating masses.

A piezo-electric converter 4 is located as an electromechanical converter device between the oscillating element 2 and the fastening device 1. The direction of oscillation of the oscillating element is indicated by the arrow Z. Oscillation of this sort causes the piezo-electric element 4 to be bent along its longitudinal axis, causing electrical charges to be separated within the piezo-electric element which, when oscillation is taking place, generates an alternating voltage at electrodes, not shown, that are attached to the piezo-electric element 4 within the fastening device.

Figure 2:
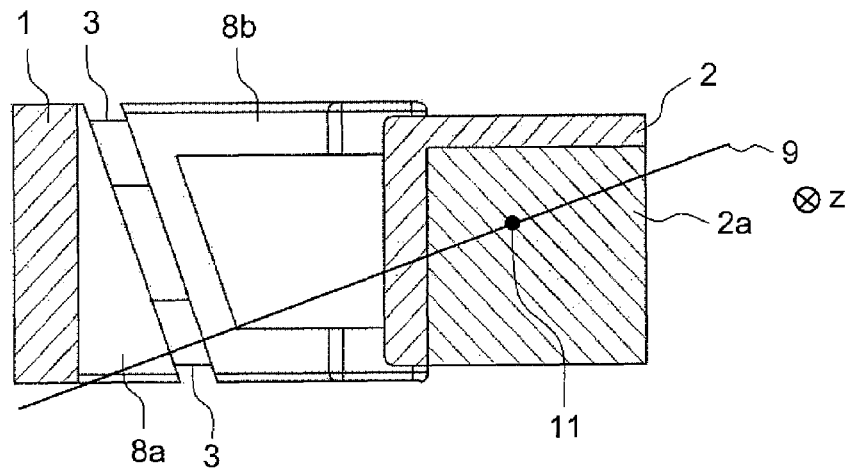
FIG. 2 shows a section through the rotation converter illustrated in FIG. 1 along the line A-A.

FIG. 2 shows a sectional view through the rotation converter R shown in FIG. 1 along sectional line A-A.

A view of the piezo-electric converter 4 has been omitted from this illustration. The fastening device 1 and the oscillating element 2 can be seen. Two leaf springs 3, clamped by two leaf spring holders 8a and 8b, are located between them.

The inclined geometry of the leaf spring holders 8a and 8b give rise to an oscillating arm indicated by line 9 passing through the center of mass M of the oscillating element 2.

Figure 3:
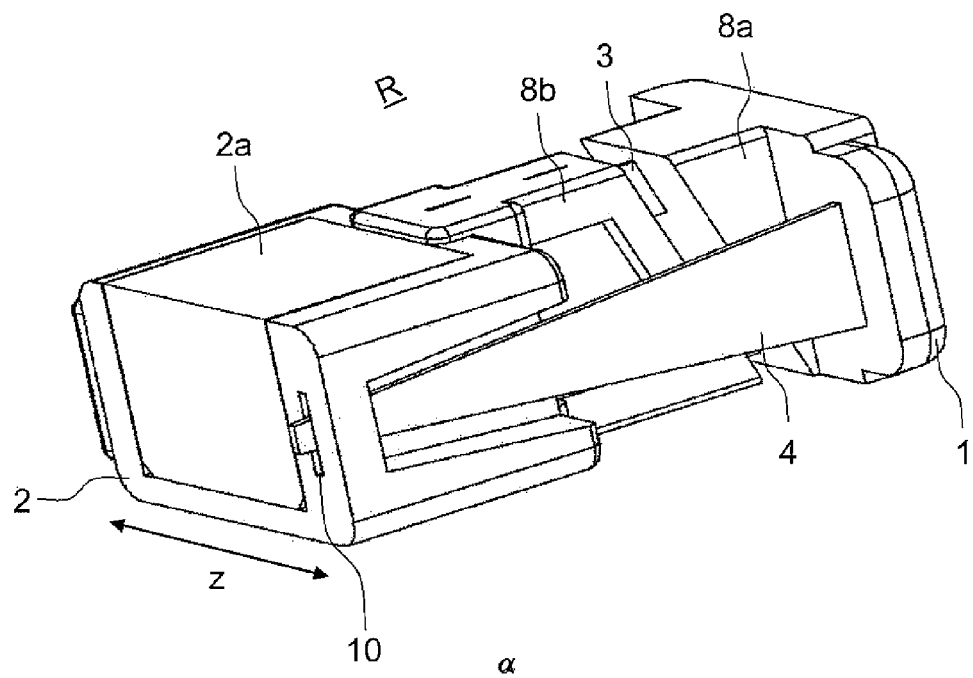
FIG. 3 is a perspective view of the rotation converter illustrated in FIG. 1.

FIG. 3 shows a perspective view of the rotation converter illustrated in FIG. 1. It is particularly intended to show the trapezoidal form of the piezo-electric converter 4. As a result of this shape, an excursion of the oscillating elements along the oscillation path, as indicated by the arrow Z, leads to an evenly distributed bend. The even distribution of the bending exposes the piezoelectric crystals to an evenly distributed force, thus resulting in an evenly distributed separation of electrical charges. This, in turn, has the effect that charge is not offset within the piezo-electric crystal. As a result, the efficiency of the piezo-electric converter 4 is optimized. It can also clearly be seen in FIG. 3 that the piezo-electric converter 4 is constrained within a slot 10 in the oscillating element 2. This shows how the oscillating element carries the piezo-electric converter 4 with it along the oscillating movement, thus causing the excursion in the piezo-electric converter 4. The ability to move freely along the slot 10 means that the piezo-electric crystal, clamped at one end in the fastening device, is not, at the end guided by the oscillating element, exposed to any deflection from the oscillating element as a result of centrifugal force perpendicular to the direction of its movement. As a result, the piezo-electric element crystal is only deflected in the favourable direction intended.

Figure 4:
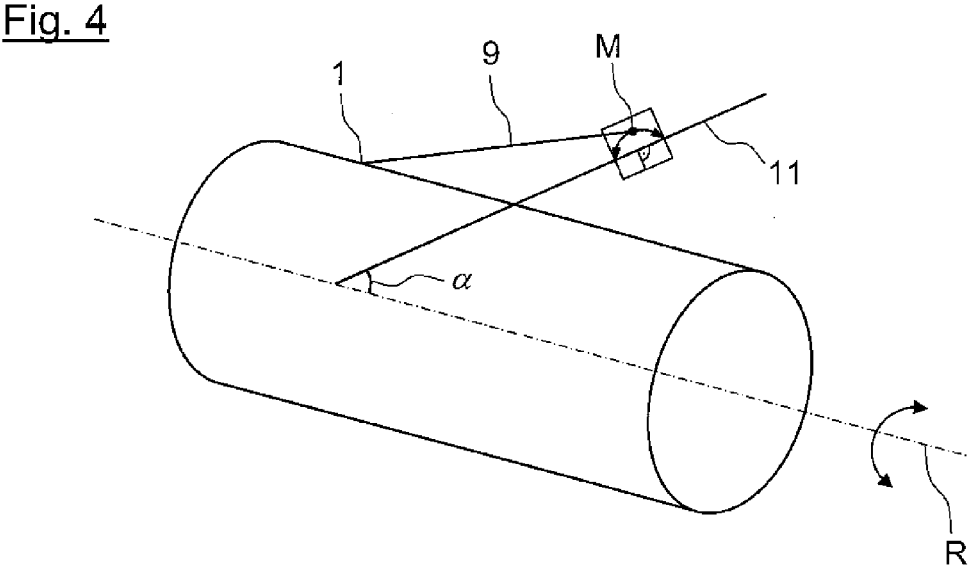
FIG. 4 shows an explanatory sketch showing the principle of the rotation converter.

FIG. 4 is intended to illustrate the way in which the rotation converter illustrated in FIGS. 1 to 3 functions. It shows a rotating body turning around the axis of rotation R. One point on the surface of this cylindrical body is marked 1, to indicate that the fastening device 1 is to be pictured here. From this point, the oscillating arm 9 passes at an angle through the center of mass M. The center of mass M now moves along the curved path, the shape of the curve depending on the form of the connecting element.

In addition to the oscillation excited by the rotation, the rotation converter is also capable of converting oscillations of the rotating body itself into electrical energy. A requirement for this is that a component of the movement of the oscillation of the rotating body is in the direction of the curved path.

In contrast to the embodiment illustrated in FIGS. 1 to 3, in which a leaf spring at an angle is incorporated as a connecting element, it would also be possible to use a hinge or joint having a pivoting access oriented, again, at an angle. In such a case, where the movement of the oscillating element is constrained around an axis of rotation, the path of the center of mass of the oscillating element 2 is a circle. For the sake of completeness it should be explained that in cases where a hinge or joint as described above is used as the connecting element, additional springs would be incorporated to provide a returning force. Configurations in which the hinge took the form of a bar that is twisted, so developing its own return force are may also feasible.

Considering FIG. 4 once more, it can be seen that the movement of the center of mass M takes place within a surface having a normal N. This normal N is oriented at an angle α to the axis of rotation R of the rotating body. It is important, and relevant to the invention, that this angle α, whose size depends on the particular configuration, is greater than zero degrees and smaller than 90 degrees. It is only in this way that it is possible to prevent centrifugal force from stopping the development of the oscillating movement.

Figure 5:
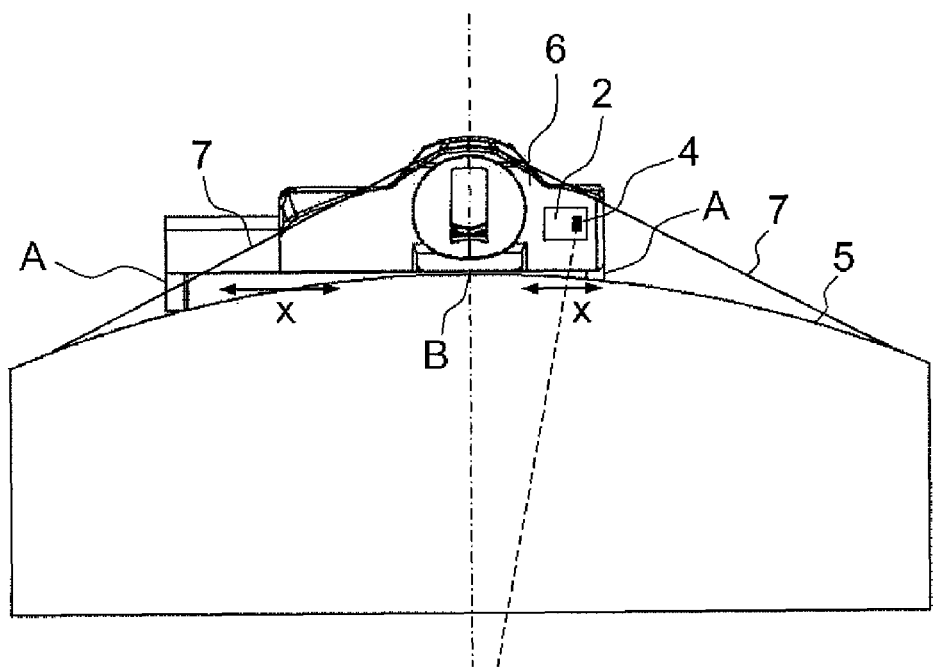
FIG. 5 is an embodiment of the housing of a rotation converter.

FIG. 5 illustrates an embodiment of a rotating body having a rotation converter. The figure suggests that the rotating body takes the form of a wheel rim 5. The valve on wheel rims is typically located in such a way that the valve fastening is aligned perpendicularly to the center of rotation, allowing the tire to be balanced.

Because no additional fastenings are to be made to the wheel rim, largely for the sake of acceptance within the automobile industry, the housing 6 for the rotation converter is located together with the valve fastening, as shown in FIG. 5. The explanations to FIG. 4 showed how the normal to the surface described by the center of mass of the vibrating element must be oriented at an angle to the axis of rotation. This means that, when at rest, the projection of the oscillating arm 9 is aligned along the axis of rotation. Because the valve or valve fastening is aligned in such a way that it runs perpendicularly above the axis of rotation, this means that when assembling the housing 6 together with the valve fastening, the rotation converter must be positioned by the valve with an offset. FIG. 5 illustrates schematically the oscillating element 2 and the piezo-electric converter 4 as well as the opening for the valve, and these must again be aligned to the center of rotation. To make this possible, the housing has two contact points or feet A where the housing 6 is held against the circumference of the wheel rim 5. Because this means that the housing is not located at the fastening point of the valve fastener, the rotation converter with its housing 6 can also be aligned to the axis of rotation of the wheel rim. This is achieved through a suitable selection of A, or of the distance between the foot A from the fastening point of the valve. This means that the distance of the foot A from the fastening point B in the direction of the arrow X is selected in order to provide high flexibility for different rim diameters. Equally, the foot A may have different lengths, or an adjustable length implemented, for instance, by unscrewing and locking. FIG. 5 finally shows a variation in which the housing 6 is fastened to the wheel rim 5 by means of a tape or cable element 7. The housing 6 is thus pushed onto the valve or the valve fastening, and fastened by means of this cable element 7.

I claim:

1. An electromechanical rotation converter comprising:
   at least one fastening element;
   an oscillating element;
   a connecting element: and
   an electromechanical conversion device configured to convert mechanical energy into electrical energy;
   wherein the at least one fastening element is configured to fasten the rotation converter to a rotating body;
   wherein the connecting element forms a movable connection between the at least one fastening element and the oscillating element, and movement of the oscillating element drives the electromechanical conversion device; and
   wherein the movable connection between the at least one fastening element and the oscillating element is formed such that a center of mass of the oscillating element moves along a curved path such that the curved path describes a perimeter of a surface, a normal to the described surface forming an angle to an axis of rotation that is less than 90° and greater than 0°.

2. The electromechanical rotation converter in accordance with claim 1, wherein the electromechanical converter device is a piezo-electric element.

3. The electromechanical rotation converter in accordance with claim 2, wherein the electromechanical converter device is a flexural converter with trapezoidal geometry.

4. The electromechanical rotation converter in accordance with claim 1, wherein the electromechanical converter device is an electromagnetic generator.

5. The electromechanical rotation converter in accordance with claim 1, wherein the electromechanical converter device is magnetostrictive generator.

6. The electromechanical rotation converter in accordance with claim 1, wherein the connecting element comprises at least one spring.

7. The electromechanical converter in accordance with claim 6, wherein the spring comprises a leaf spring.

8. The electromechanical converter in accordance with claim 1, wherein the connecting element comprises at least one bearing.

9. The electromechanical rotation converter in accordance with claim 1, wherein the fastening device comprises at least a part of the housing that holds the rotation converter.

10. The electromechanical rotation converter in accordance with claim 9, wherein the housing is fastened to a wheel rim by a valve fastening and includes at least two contact points to position the housing in its fitting orientation on a wheel rim.

11. The electromechanical rotation converter in accordance with claim 9, wherein the housing is fastened to a rim by a tape or cable element that extends around the rim.

12. The electromechanical rotation converter in accordance with claim 10, wherein the at least two contact points are located at different distances from the valve fastening.

13. A method for generating electrical energy with an electromechanical converter device, comprising:
    driving a converter device by an oscillating element which is configured to convert mechanical energy to electrical energy; and
    causing the oscillating element to oscillate about a rest point by a rotational movement in which the oscillating element is moved along a curved path that describes a perimeter of a surface, a normal to said surface being at an angle of less than 90° and more than 0° to the an axis of rotation.

14. The method in accordance with claim 13, wherein oscillation of the oscillating element is achieved by rotational movement of a rotating body.

15. The method in accordance with claim 14, wherein the rotating body oscillates with a component of its motion being in a direction of the rotational movement, said component driving the oscillating element.

* * * * *